S. A. DOBYNE.
WORK SUPPORT FOR FASTENER INSERTING MACHINES.
APPLICATION FILED FEB. 8, 1915.

1,287,577.

Patented Dec. 10, 1918.
3 SHEETS—SHEET 3.

Witnesses:
Harry H. Reiss.
Arthur B. Cremer.

Inventor:
STEPHEN A. DOBYNE,
By John H. Bruninga
His Attorney.

UNITED STATES PATENT OFFICE.

STEPHEN A. DOBYNE, OF ST. LOUIS, MISSOURI, ASSIGNOR TO CHAMPION SHOE MACHINERY COMPANY, OF ST. LOUIS, MISSOURI, A CORPORATION OF MISSOURI.

WORK-SUPPORT FOR FASTENER-INSERTING MACHINES.

1,287,577.

Specification of Letters Patent. Patented Dec. 10, 1918.

Application filed February 8, 1915. Serial No. 6,937.

*To all whom it may concern:*

Be it known that I, STEPHEN A. DOBYNE, a citizen of the United States, and residing at St. Louis, in the State of Missouri, have invented a certain new and useful Improvement in Work-Supports for Fastener-Inserting Machines, of which the following is a specification.

This invention relates to work supports, and more particularly, to work supports or horns for fastener inserting machines.

This application is a continuation of application Serial Number 851,718, filed July 18, 1914, as to the subject matter common to the two applications.

A fastener inserting machine, especially when used in the manufacture of shoes, is provided with a work support, and this work support must be intermittently depressed during the feed of the work, and then released to permit the fastener to be driven. Since the thickness of the stock varies, the distance between the tip of the work support and the presser-foot necessarily varies as the fastener inserting operation is performed on the work. This requires means, having an adjustable connection with the work support, for depressing the work support equal distances irrespective of the position of the work support. Various forms of mechanism have been designed for depressing the work support intermittently during the operation of the machine, but so far the only mechanism which has been found satisfactory, commercially, has been a pawl and ratchet mechanism. In view of the fact, however, that the pawl must engage the ratchet as it moves over the same, and the spring supporting the work support must be a strong spring to take the impact of the driver, and, in view of the fact that the machine runs at a high speed, the wear and tear on these pawls and ratchets is very great, necessitating their constructions to be very heavy.

Some of the objects of this invention, therefore, are to provide work support controlling mechanism in which the parts are so constructed and relatively arranged and timed, that the parts will move into and out of coöperative relation when the stresses on those parts are a minimum, which will be simple in construction, and positive, accurate, and effective in its operation.

Another object is to provide means for adjusting the work support for different classes of work and for different lasts.

Further objects will appear from the detail description taken in connection with the accompanying drawing, in which:

Fig. 2 is an enlarged detail section of Fig. 1;

Fig. 6 is a section on the line 6—6, Fig. 2;
Fig. 7 is a section on the line 7—7, Fig. 6;
Fig. 8 is a detail side elevation of the abutment for the actuator and the actuating cam.

Referring to the accompanying drawings, 10 designates a column having a machine head 11 thereon which carries the fastener inserting mechanism comprising a driver 12, and which also carries the main drive shaft 13.

A work support spindle 14 having a work support 15 thereon, is mounted to slide vertically in the column, and passes, at its lower end, through a sleeve 16. The sleeve 16 slides in a bracket 17 provided with ears 18 clamped by bolts 19 to the column. The work support spindle has a spring 20 bearing, at one end, against the sleeve 16, and, at its other end, against a sleeve 21 clamped to the work support. The lower end of the spindle has a nut 22 thereon, abutting against a shoulder in the sleeve, and limiting the upward movement of the work support spindle.

A bell crank lever is pivoted at 23 between the side members 24 on the bracket 17, and has one arm 25 thereof connected by a link 26 with the sleeve 16, and has the other arm 27 connected by a link 28 with the treadle 29, which treadle is pivoted at 30 in the base 31 supporting the column 10. A link 32, connected at its lower end to the treadle, extends through the column, and has a spring 33 thereon bearing, at one end, against the adjustable nut 34 and, at the other end, against the column, so as to normally tend to hold the treadle in raised position. The arm 25 and the link 26 form together a toggle, and the movement of this toggle is limited by an adjustable set screw 35 on the bracket 17. The rear end of the treadle has a yoke 36 embracing a shaft 37 receiving the end of a clutch rod 38, having an adjustable nut 39 bearing against the yoke.

Figures 1, 9, 10, 11, 12:
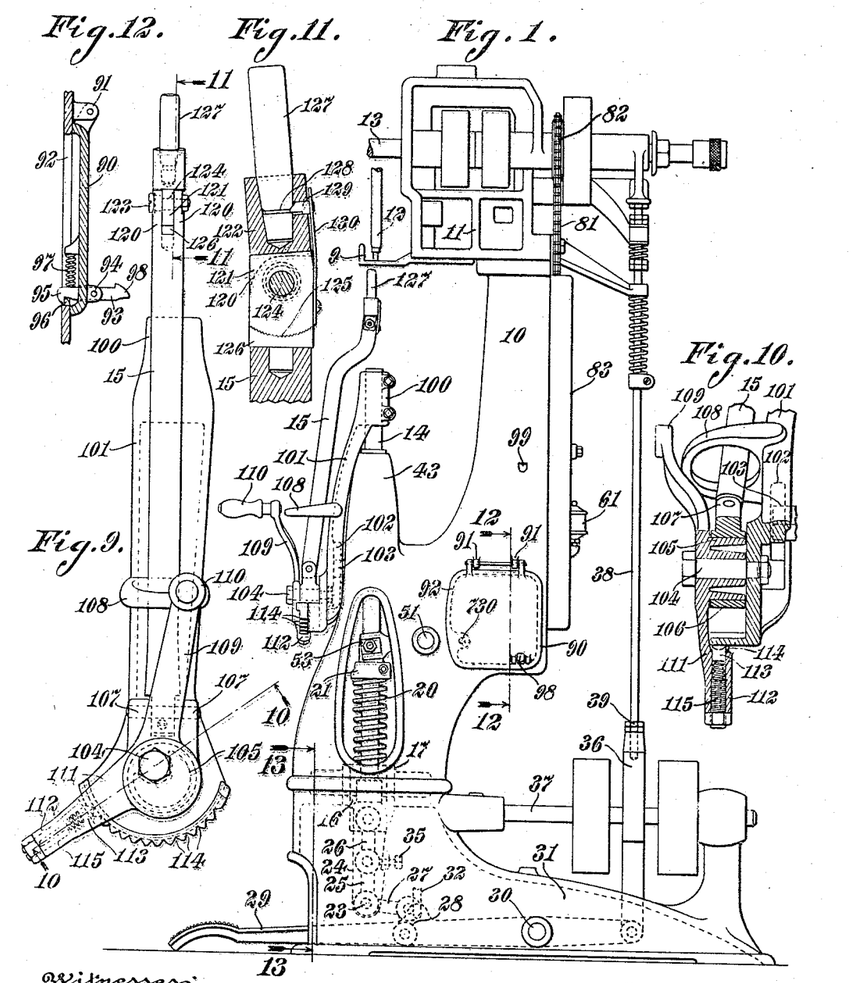
Figure 1 is a side elevation illustrating an embodiment of this invention.
Fig. 9 is an enlarged detail front elevation of the work support, showing the adjusting mechanism.
Fig. 10 is a section on the line 10—10, Fig. 9.
Fig. 11 is an enlarged detail section on the line 11—11, Fig. 9.
Fig. 12 is a section on the line 12—12, Fig. 1; and,
Fig. 13 is an enlarged section on the line 13—13, Fig. 1.

The construction of the mechanism so far described is substantially the same as shown and described in the United States Patent No. 1,224,450, patented May 1, 1917. When the parts are in the position shown in Fig. 1, with the toggle 25, 26 straightened, the spring 20 will hold the work support in raised position, and this work support can be depressed by means of a work support controlling mechanism, as hereinafter described. When, however, the treadle is released, the toggle will become broken, and the sleeve 16, which forms an abutment for the spring 20, will drop, carrying the work support with it so as to permit removal of the work from the work support.

Figures 2, 6, 7, 8, 13:
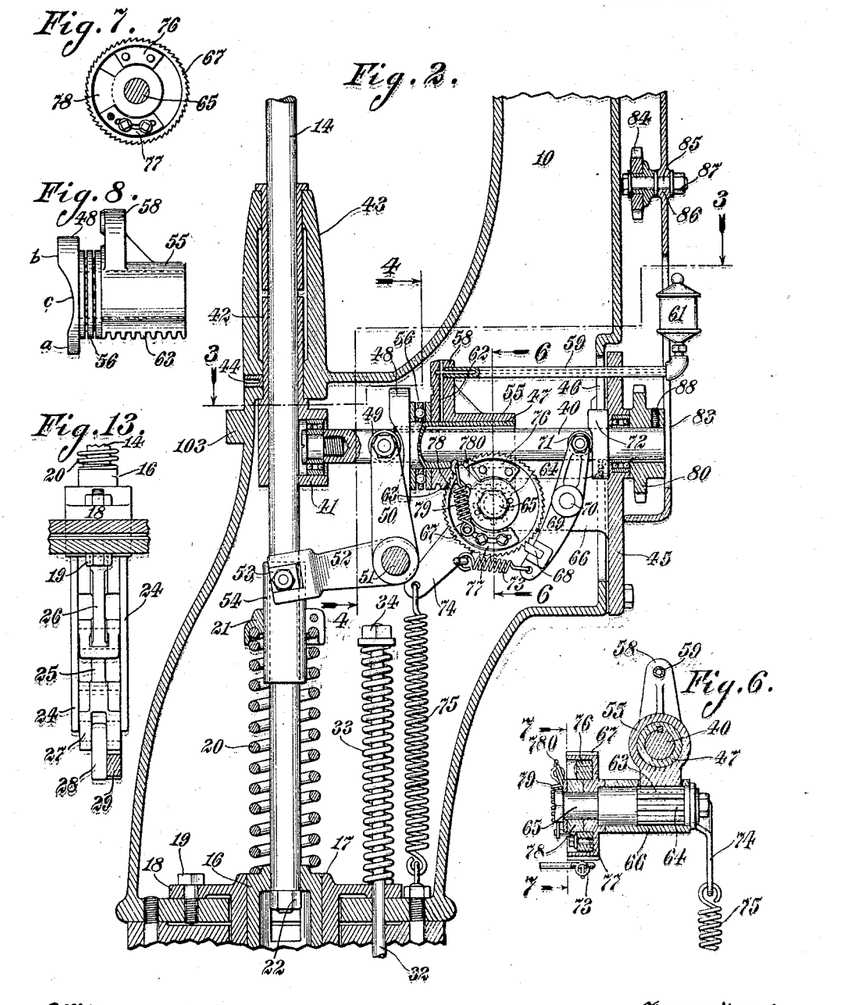
Figure 3:
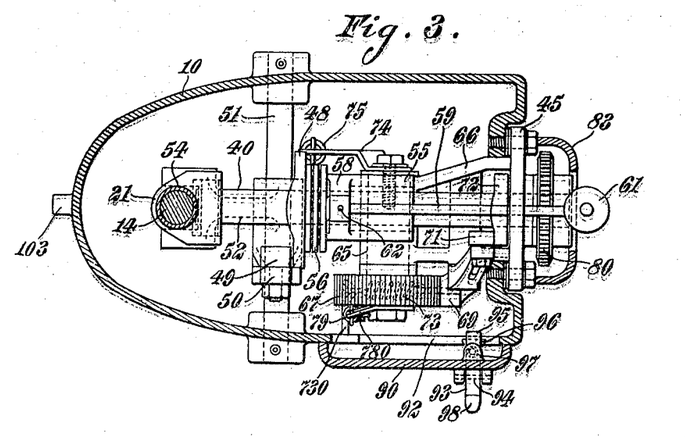
Fig. 3 is a section on the line 3—3, Fig. 2.
Figure 4:
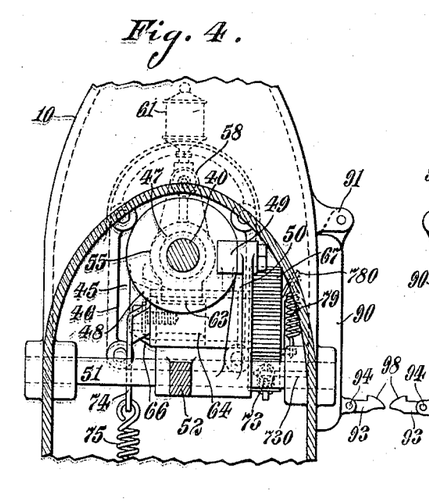
Fig. 4 is a section on the line 4—4, Fig. 2.
Figure 5:
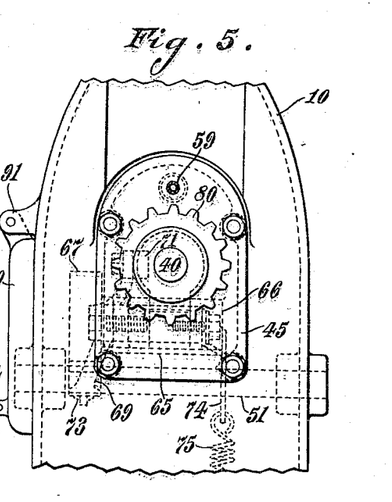
Fig. 5 is a rear elevation of Fig. 2.

A counter shaft 40 is mounted, at one end, in a bearing bracket 41 formed on the lower end of a sleeve 42, which is clamped in the guide 43 of the work support spindle 14 by means of a screw 44. The other end of the counter shaft 40 is mounted in a plate 45 bolted to, and closing an opening 46 in, the rear of the column 10. The ends of the shaft are preferably mounted in ball bearings, as shown in Fig. 2. The shaft 40 has splined thereon a sleeve 47 carrying, at one end, a prime actuator or cam 48. This cam is arranged to coöperate with a cam roll 49 on the arm 50 of a bell crank lever loosely pivoted on a shaft 51 in the column, and having a forked arm 52 engaging a block 53 on the sleeve 54 which is clamped to the work support spindle 14.

An abutment member 55 is mounted on the sleeve 47, and a thrust bearing 56 is mounted between the cam 48 and the abutment. The abutment has an arm or bracket 58 engaged by a rod or pipe 59 which is screwed into the bracket 58 and slides in the plate 45, and this pipe has mounted thereon an oil cup 61, so as to conduct oil to the abutment, which is grooved, as shown at 62, to permit the feeding of oil to the bearing between the abutment and the actuating cam 48.

The abutment 55 has formed, on its lower surface, a rack 63 which meshes with a gear 64 fixed to a shaft 65 mounted between a pair of forwardly extending lugs 66 formed on the plate 45. The shaft 65 has fixed, on one end, an arm 74, and a spring 75 is connected, at one end, to the arm and, at the other end, to the base of the column. This spring operates to normally move the abutment and the cam thereon to the left, Fig. 2. A ratchet 67 is loosely mounted on the shaft 65, and has mounted thereon a fixed stop 76 and a circumferentially adjustable stop 77. An arm 78 is fixed to the shaft 65 to play between the stops 76 and 77. A spring 79, connected at one end to an arm 780, fixed to the arm 78 and connected at the other end to the adjustable stop 77, normally operates to hold the stop 77 and the arm 78 in engagement. The ratchet 67 is engaged by a hardened tooth 68 set into a pawl lever 69 pivoted at 70 between the lugs 66, and having a cam roll 71 engaged by a cam 72 fixed to the shaft 40. A spring 73, connected, at one end, to the pawl lever 69 and, at its other end, to the pin 730 on the column, normally operates to hold the pawl tooth 68 in engagement with the ratchet 67.

The shaft 40 has mounted thereon a sprocket 80 engaged by a sprocket chain 81 passing over a sprocket 82 on the main drive shaft 13. The sprocket and chain are inclosed by a guard 83 suitably secured to the column. An idler 84, serving to tighten the chain 81, has a shaft 85 mounted in a transverse slot 86 in the guard 83, and adapted to be clamped in position by a nut 87. The sprockets 80 and 82 are of the same diameter, so that the counter shaft will be driven at the same speed as the main drive shaft 13. The sprocket 80 is clamped to the shaft 40 by a screw 88, so that the angular relations of the shafts 13 and 40 may be adjusted to adjust the timing of the machine.

A door 90, pivoted at 91 on the column, closes an opening 92 opposite the work support controlling mechanism. A latch 93 is pivoted at 94 on the door, and this latch has a beveled and hooked end 95 engaging the lower edge 96 of the opening. A spring 97 operates to move the latch to engaging position. The outer end 98 of the latch is also hooked and beveled to engage an opening 99 in the column, so as to latch the door in open position.

Referring now to Figs. 1 and 9 to 11, inclusive, 100 designates a split sleeve which is clamped on the spindle 14. This sleeve has integral therewith a downwardly extending arm 101, which is provided with a pair of spaced ribs 102 forming a channel engaging a lug 103 on the column. The arm 101 has mounted therein a pin 104 which has rotatively mounted thereon an eccentric 105 supporting an eccentric strap 106, which is provided with a pair of spaced ears 107 for pivotally supporting the lower end of the jack post 15. The jack post passes through a yoke 108 on the arm 101. The eccentric has formed thereon an upwardly extending arm 109 provided with a handle 110. A downwardly extending arm 11¹ is formed on the eccentric, and is provided with a boss 112 which is bored to receive a spring-pressed plunger 113 having a beveled end adapted to engage a segmental rack 114 formed on the arm 101. The shank of the plunger 113 works in, and the end of the spring bears against, a hollow sleeve or nut 115 threaded into the boss 112, whereby the tension of the spring may be adjusted.

The end of the jack post 15 is slotted to provide a pair of spaced ears 120 which receive a tongue 121 of a last spindle holder 122. A pin 123 extends through the ears, and this pin is provided with an eccentric portion 124 engaging the tongue 121. The pin 123 is slotted, at one end, while the other end is threaded to receive a nut for clamping the spindle holder in position. The lower end of the tongue is toothed, as shown at 125, to engage the teeth in an insert or block 126 removably mounted in the jack post. The last spindle 127 is removably mounted in the spindle holder, and is provided with a groove 128 engaged by a pin 129 on the end of a leaf spring 130 clamped to the spindle holder.

In the operation of this machine, the counter shaft 40 will be driven at the same speed and in timed relation to the main drive shaft 13. Rotation of the counter shaft 40 will cause the cam 48 to intermittently depress the work support against the tension of its spring 20. The spring 73 and cam 72 will, on the other hand, intermittently move the pawl lever 69 into and out of engagement with the ratchet 67, so as to intermittently lock and unlock the abutment 55. When the abutment 55 is unlocked, the spring 75 will operate to move it to the left until it is stopped by the engagement of the cam 48 with the cam roll 49 connected to the work support. When, however, the abutment is locked, the cam 48 is restrained against movement to the right, Fig. 2. When the cam 48 is rotated after the pawl has engaged and locked the ratchet, the first movement will cause the cam and its abutment to move to the right, Fig. 2, until the lost motion between the arm 78 and the stop 76, i. e., the lost motion between the ratchet and the abutment, has been taken up, and the cam will thereafter depress the work support. Since the cam 48 has a predetermined rise, and since the lost motion is a predetermined amount, the work support spindle will be depressed a predetermined amount during every revolution of the cam, provided the cam is held in engagement with the cam roll 49 at all times.

The operation of the machine in inserting fasteners is as follows: Starting with the driver down, with the work support raised and clamping the work against the presser foot 9, with the cam roll 49 on the low part $a$ of the cam 48, and with the cam roll 71 on the high part of the cam 72, so that the pawl lever 69 will be out of engagement with the ratchet 67, the abutment 55 will, at this time, be unlocked. During the rotation of the main drive shaft and the counter shaft in a counter clockwise direction, looking toward the front of the machine, the cam 72 will first permit the pawl lever to move into engagement with the ratchet 67 to lock the same, and the cam rise $b$ on the cam 48 will then engage the cam roll 49 to first take up the lost motion between the ratchet and the abutment, and then depress the work support against the tension of its spring 20. During the depression of the work support, the feed of the work takes place. Thereafter, the cam roll 49 will leave the rise $b$ of the cam 48, so as to permit the spring 20 to again raise the work support and clamp the work against the presser foot. The pawl is now disengaged from the ratchet so as to unlock the abutment and permit the spring 75 to move it to the left, so that the low part $a$ of the cam will be in engagement with the roll 49, irrespective of the position of this roll, caused by a variation in the thickness of the work between the work support and the presser foot. While the work support is held in raised position, the fastener is inserted, the work support being supported by the spring 20. Thereafter, the pawl moves again into engagement with its ratchet 67, so as to lock the abutment 55, and the cam 48 operates again to depress the work support against the tension of its spring, while the abutment is locked. This completes the cycle of operations.

In the operation of attaching a sole to a shoe, the thickness of the stock often varies abruptly, as while passing from the fore part to the shank of the shoe. An abrupt decrease in thickness will cause the cam roll 49 to come to a stop (with the horn) to a position to the right, Fig. 2, of its preceding position, and thereby not only put considerable strain upon the pawl and ratchet, but is liable to snap off the point of the tooth on the ratchet as the pawl is moved out of engagement therewith. In accordance with this invention, the cam 48 is provided with an abnormal depression $c$ which is of sufficient depth so that the cam roll 49 will never reach the bottom of this depression when passing from the thickest to the thinnest stock. The parts are also so timed that the pawl will be moved out of engagement with the ratchet after the cam roll 49 comes opposite this abnormal depression $c$. The operation will, therefore, be as follows: Starting with the work support raised and with the fastener driven, the ratchet is first locked by its pawl, so as to lock the abutment, and the cam 48 depresses the work support a predetermined amount. After the cam roll 49 comes opposite the abnormal depression and moves therein, but not to the bottom of the same, the ratchet is released so as to unlock the abutment, and this abutment will move to the left, Fig. 2, until arrested by the cam roll. As the cam 48 continues to revolve, the cam roll 49 will move out of the abnormal depression $c$ and cause the cam, together with its abutment, to be moved by a cam action to the right until the low part $a$ of the cam reaches the cam roll. It will, therefore, be seen that the abutment is unlocked and positioned with respect to the actuated part 49 connected with the work support, after the work support has clamped the work. The cam roll 49 connected with the work support being, therefore, always positioned in engagement with the low part $a$ of the cam, it is insured that the work support will be depressed a predetermined amount, irrespective of its thickness.

For different classes of work the depression of the work support must vary. Thus, for slugging or heel seating, the depression must be less than for sole attaching. Now, in this machine, the depression is proportional to the difference between the cam rise of the cam 48 and the lost motion between the ratchet and the abutment. The depression can, therefore, readily be varied by varying the amount of the lost motion. This can be done by varying the position of the adjustable stop 77. This lost motion also insures an engagement between the pawl and the ratchet teeth.

The engagement of the ribs 102 with the lug 103 operates to guide the jack post in its movements and support the same laterally. The jack post can be adjusted vertically for different sized lasts and heels by the adjustment of the eccentric through the manipulation of the handle 110, and this eccentric is retained and locked in any of its adjusted positions by the plunger 113. The jack post is mounted on the spindle for universal movement, the eccentric forming one of the axes of the universal joint. The last spindle can be adjusted to different inclinations by raising the spindle holder through the medium of the eccentric 124, and, when adjusted, the spindle holder is dropped to reengage it with the toothed block 126. The nut on the pin 123 firmly locks the parts in adjusted position.

It will, therefore, be seen that the invention accomplishes its objects. By providing a movable abutment for the actuated member which is mounted, constructed and arranged to follow up the movements of the work support, and which is locked before and while the work support is depressed, there will be no sudden strain put upon any teeth, and the pawl can move fully into engagement with the teeth before any strain is put on the parts. This will prevent stripping of teeth, and will also insure a noiseless operation. By unlocking the abutment at the time when the work is clamped by the work support, and at a time when there is no strain upon it, the above results are enhanced. In this construction the ratchet teeth can be fairly coarse for fine adjustment. Although only a part of the ratchet teeth are utilized, the ratchet is preferably constructed as a complete wheel, and, since the stops 76 and 77 can be interchanged, as well as moved through 90°, this ratchet can be shifted on its shaft 65 to utilize different parts thereof. The jack post can also be adjusted to different heights, as well as to different inclinations, and this adjustment can be accomplished quickly, and when made the parts will be firm.

It is obvious that various changes may be made in details of construction without departing from the spirit of this invention, and it is, therefore, to be understood that this invention is not to be limited to the specific details shown and described.

It is to be noted that an "actuator", as used in the claims, is an element, which inherently has the property of converting motion, as distinguished from a mere connection between an actuator and an actuated member.

Having thus described the invention, what is claimed is:

1. In a machine of the class described, a work support, a spring tending normally to maintain said work support in work clamping position, an actuator adapted to intermittently depress said work support against the action of said spring, and means for adjusting said actuator automatically in accordance with the thickness of the work.

2. In a machine of the class described, a work support, a spring tending normally to maintain said work support in work clamping position, an actuator adapted to intermittently depress said work support against the action of said spring, and means for adjusting said actuator constructed to cause it to depress said work support a predetermined distance irrespective of the thickness of the work.

3. In a machine of the class described, a work support, a spring tending normally to maintain said work support in work clamping position, an actuator adapted to intermittently depress said work support against the action of said spring, and means for adjusting said actuator to different positions in accordance with the thickness of the work.

4. In a machine of the class described, a work support, a spring tending normally to maintain said work support in work clamping position, an actuator adapted to intermittently depress said work support a predetermined distance against the action of said spring, and means for adjusting said actuator automatically in accordance with the thickness of the work.

5. In a machine of the class described, a work support, a spring tending normally to maintain said work support in work clamping position, an actuator adapted to intermittently depress said work support a predetermined distance against the action of said spring, and means for adjusting said actuator, constructed to cause the uniform depression of said work support to be maintained irrespective of the thickness of the work.

6. In a machine of the class described, a work support, a spring tending normally to maintain said work support in work clamping position, an actuator adapted to intermittently depress said work support against the action of said spring, and means for supporting said actuator for movement to different positions in accordance with the thickness of the work.

7. In a machine of the class described, a work support, a spring tending normally to maintain said work support in work clamping position, an actuator adapted to intermittently depress said work support against the action of said spring, and means for supporting said actuator to move with said work support in accordance with the thickness of the work.

8. In a machine of the class described, a work support, a spring tending normally to maintain said work support in work clamping position, an actuator adapted to intermittently depress said work support against the action of said spring, and means for supporting said actuator and for connecting said actuator with said work support, constructed to cause said actuator to follow up said work support in its different positions as the thickness of the work varies.

9. In a machine of the class described, a work support, a spring tending normally to maintain said work support in work clamping position, an actuator adapted to intermittently depress said work support against the action of said spring, means for supporting said actuator for movement to different positions in accordance with the thickness of the work, and means for intermittently locking said actuator against the said movement while operating to depress said work support.

10. In a machine of the class described, a work support, a spring tending normally to maintain said work support in work clamping position, an actuator adapted to intermittently depress said work support against the action of said spring, means for supporting said actuator and for connecting said actuator with said work support in its different positions as the thickness of the work varies, and means for locking said actuator in position while operating to depress said work support.

11. In a machine of the class described, a work support, a spring tending normally to maintain said work support in work clamping position, an actuator adapted to intermittently depress said work support against the action of said spring, means for locking said actuator in position while operating to depress said work support, and means for adjusting said actuator in accordance with the thickness of the work.

12. In a machine of the class described, a work support, a spring tending normally to maintain said work support in work clamping position, an actuator adapted to intermittently depress said work support against the action of said spring, means for locking said actuator in position while operating to move said work support, and means for releasing said actuator constructed to permit it to adjust itself to the thickness of the work.

13. In a machine of the class described, a work support, a spring tending normally to maintain said work support in work clamping position, an actuator adapted to intermittently depress said work support against the action of said spring, means for supporting said actuator constructed to permit it to adjust itself to the thickness of the work, and means for locking said actuator in adjusted position while operating to depress said work support.

14. In a machine of the class described, a work support, a spring tending normally to maintain said work support in work clamping position, an actuator adapted to intermittently depress said work support against the action of said spring, means for supporting said actuator to move with said work support in accordance with the thickness of the work, and means for locking said actuator in position while operating to depress said work support.

15. In a machine of the class described, a work support, a spring tending normally to maintain said work support in work clamping position, an actuator adapted to intermittently depress said work support against the action of said spring, a member connected with said work support and actuated by said actuator, and means for adjusting said actuator with respect to said actuated member in accordance with the thickness of the work.

16. In a machine of the class described, a work support, a spring tending normally to maintain said work support in work clamping position, an actuator adapted to intermittently depress said work support against the action of said spring, a member connected with said work support and actuated by said actuator, said actuator being adjustable with respect to said actuated member in accordance with the thickness of the work, and means for locking said actuator while operating to depress said work support.

17. In a machine of the class described, a work support, a spring tending normally to maintain said work support in work clamping position, an actuator adapted to intermittently depress said work support against the action of said spring, a member connected with said work support and actuated by said actuator, said actuator being adjustable with said work support in accordance with the thickness of the work, and means for locking said actuator while operating to depress said work support.

18. In a machine of the class described, a work support, a spring tending normally to maintain said work support in work clamping position, an actuator adapted to intermittently depress said work support against the action of said spring, a member connected with said work support and actuated by said actuator, and means for locking said actuator while operating to depress said work support and for releasing said actuator to permit it to adjust itself in accordance with the thickness of the work.

19. In a machine of the class described, a work support, a spring tending normally to maintain said work support in work clamping position, an actuator adapted to intermittently depress said work support against the action of said spring, an abutment for said actuator, and means for locking said abutment.

20. In a machine of the class described, a work support, a spring tending normally to maintain said work support in work clamping position, an actuator adapted to intermittently depress said work support against the action of said spring, an abutment for said actuator movable to different positions in accordance with the thickness of the work, and means for locking said abutment while said actuator depresses said work support and for releasing said abutment while said work support adjusts itself to the work.

21. In a machine of the class described, a work support, a spring tending normally to maintain said work support in work clamping position, an actuator adapted to intermittently depress said work support against the action of said spring, and means for supporting said actuator constructed to cause it to depress said work support uniform distances irrespective of the thickness of the work.

22. In a machine of the class described, a work support, a spring tending normally to maintain said work support in work clamping position, means for causing said work support to normally clamp the work, an actuator adapted to intermittently depress said work support against the action of said spring, and means for moving said actuator to maintain its engagement with said work support as the thickness of the work varies.

23. In a machine of the class described, a work support, a spring tending normally to maintain said work support in work clamping position, means for causing said work support to normally clamp the work, an actuator adapted to intermittently depress said work support against the action of said spring, means for moving said actuator to maintain its engagement with said work support as the thickness of the work varies, and means for locking said actuator while depressing said work support.

24. In a machine of the class described, a work support, a spring tending normally to maintain said work support in work clamping position, means for causing said work support to normally clamp the work, an actuator adapted to intermittently depress said work support against the action of said spring, means for moving said actuator to maintain its engagement with said work support as the thickness of the work varies, and means for locking said actuator while depressing said work support and for releasing said actuator while said work support clamps the work.

25. In a machine of the class described, a work support, means for causing said work support to normally clamp the work, a cam for depressing said work support intermittently during the operation of the machine, and means for supporting said cam construction to permit it to move in accordance with the thickness of the work.

26. In a machine of the class described, a work support, means for causing said work support to normally clamp the work, a cam for depressing said work support intermittently during the operation of the machine, means for supporting said cam constructed to permit it to move in accordance with the thickness of the work, and means for locking said cam while depressing said work support.

27. In a machine of the class described, a work support, means for causing said work support to normally clamp the work, a cam for depressing said work support intermittently during the operation of the machine, means for supporting said cam constructed to permit it to move in accordance with the thickness of the work, and means for locking said cam while depressing said work support and for releasing said cam while said work support clamps the work.

28. In a machine of the class described, a work support, a cam for depressing said work support intermittently during the operation of the machine, means for movably supporting said cam, a ratchet connected to said cam, and a pawl for locking said ratchet.

29. In a machine of the class described, a work support, a cam for depressing said work support intermittently during the operation of the machine, means for movably supporting said cam, a ratchet connected to said cam, a pawl, and means for moving said pawl into and out of engagement with said ratchet.

30. In a machine of the class described, a work support, means for causing said work support to clamp the work, actuating means adapted to intermittently depress said work support, and means for adjusting said actuating means to the thickness of the work after the work has been finally clamped by the work support.

31. In a machine of the class described, a work support, means for causing said work support to normally clamp the work, actuating means adapted to intermittently depress said work support and release the same to clamp the work, and means for adjusting said actuating means to the thickness of the work after the work has been finally clamped by the work support.

32. In a machine of the class described, a work support, means for causing said work support to clamp the work, actuating means adapted to intermittently depress said work support, and means for setting one of the elements of said actuating means in accordance with the thickness of the work after the work has been finally clamped by the work support.

33. In a machine of the class described, a work support, means for causing said work support to normally clamp the work, actuating means adapted to intermittently depress said work support and release the same to clamp the work, and means for setting one of the elements of said actuating means in accordance with the thickness of the work after the work has been finally clamped by the work support.

34. In a machine of the class described, a work support, means for causing said work support to normally clamp the work, actuating means adapted to intermittently depress the work support and release the same to clamp the work, means for supporting and connecting one of the elements of said actuating means with said work support to adjust therewith as the thickness of the work varies, and means for permitting such adjustment of said element after the work has been finally clamped by the work support.

35. In a machine of the class described, a work support, means for causing said work support to normally clamp the work, actuating means adapted to intermittently depress the work support and release the same to clamp the work, means for supporting and connecting one of the elements of said actuating means with said work support to adjust therewith as the thickness of the work varies, and means for permitting such adjustment of said element after the work has been finally clamped by the work support.

36. In a machine of the class described, a work support, means for causing said work support to clamp the work, an actuator adapted to intermittently move said work support, and means for setting said actuator in accordance with the thickness of the work after the work has been finally clamped by the work support.

37. In a machine of the class described, a work support, means for causing said work support to clamp the work, an actuator adapted to intermittently move said work support, means for supporting said actuator to move to different operating positions in accordance with the thickness of the work, and means for permitting said actuator to move to operative positions after the work has been finally clamped by the work support.

38. In a machine of the class described, a work support, means for causing said work support to clamp the work, an actuator adapted to intermittently move said work support, means for supporting said actuator to move to different operative positions in accordance with the thickness of the work, and locking means constructed to permit said actuator to move to operative positions after the work has been finally clamped by the work support.

39. In a machine of the class described, a work support, means for causing said work support to clamp the work, an actuator adapted to intermittently move said work support, means for supporting said actuator to move to different operative positions in accordance with the thickness of the work, and means adapted to lock said actuator while moving said work support and unlock said actuator after the work has been finally clamped by the work support.

40. In a machine of the class described, a work support, means for causing said work support to clamp the work, an actuator adapted to intermittently move said work support, means for supporting said actuator to move to different operative positions in accordance with the thickness of the work, and means adapted to lock said actuator while moving said work support and to unlock said actuator after the pressure thereon is relieved.

41. In a machine of the class described, a work support, means for causing said work support to clamp the work, an actuator adapted to intermittently move said work support, means for supporting said actuator to move to different operative positions in accordance with the thickness of the work, and means adapted to lock and unlock said actuator, said parts being constructed to cause said actuator to be unlocked after the pressure thereon is relieved.

42. In a machine of the class described, a work support, means for causing said work support to clamp the work, an actuator adapted to intermittently move said work support, means for supporting and connecting said actuator with said work support to adjust therewith as the thickness of the work varies, and means for permitting such adjustment of said actuator after the work has been finally clamped by the work support.

43. In a machine of the class described, a work support, means for causing said work support to clamp the work, an actuator adapted to intermittently move said work support, means for supporting and connecting said actuator with said work support to adjust therewith as the thickness of the work varies, and means for permitting such adjustment of said actuator after the pressure thereon is relieved.

44. In a machine of the class described, a work support, means for causing said work support to clamp the work, an actuator adapted to intermittently move said work support, means for supporting and connecting said actuator with said work support to adjust therewith as the thickness of the work varies, and means adapted to lock said actuator while moving said work support and to unlock said actuator after the pressure thereon is relieved.

45. In a machine of the class described, a work support, means for causing said work support to clamp the work, an actuator adapted to intermittently move said work support, means for supporting and connecting said actuator with said work support to adjust therewith as the thickness of the work varies, and means adapted to lock and unlock said actuator, said parts being constructed to cause said actuator to be unlocked after the pressure thereon is relieved.

46. In a machine of the class described, a main drive shaft operating fastener inserting mechanism, a counter shaft driven therefrom and parallel therewith, a work support, means for causing said work support to normally clamp the work, and means operated from said counter shaft adapted to intermittently depress said work support uniform distances irrespective of the thickness of the work.

47. In a machine of the class described, a main drive shaft operating fastener inserting mechanism, a counter shaft parallel therewith, a sprocket chain connecting said shafts, a work support, means for causing said work support to normally clamp the work, and means operated from said counter shaft adapted to intermittently depress said work support uniform distances irrespective of the thickness of the work.

48. In a machine of the class described, a machine frame, a work support mounted for movement in said frame, means for controlling the operation of said work support, and a bracket for supporting said controlling means and detachably connected to said frame, whereby said controlling means may be removed with said bracket from said frame.

49. In a machine of the class described, a machine frame, a work support mounted for movement in said frame, mechanism for intermittently depressing said work support, a bracket adapted to support said mechanism as a unit, and means for detachably connecting said bracket to said frame, whereby said mechanism may be removed with said bracket from said frame.

50. In a machine of the class described, a machine frame, a work support mounted for movement in said frame, an actuator connected to intermittently operate said work support, a bracket adapted to support said actuator, and means for detachably connecting said bracket to said frame, whereby said actuator may be removed with said bracket from said frame.

51. In a machine of the class described, a machine frame, a work support mounted for movement in said frame, mechanism including an actuating shaft for intermittently depressing said work support, a bracket adapted to support said mechanism as a unit, and means for detachably connecting said bracket to said frame, whereby said mechanism may be removed with said bracket from said frame.

52. In a machine of the class described, a main drive shaft operating fastener inserting mechanism, a counter shaft driven therefrom and parallel therewith, a work support, means for causing said work support to normally clamp the work, means operated from said counter shaft adapted to intermittently depress said work support, a bracket adapted to support said counter shaft, and means for detachably connecting said bracket to said frame.

53. In a machine of the class described, a hollow machine column, a work support mounted for movement in said column, mechanism arranged in said column and connecting to intermittently depress said work support, a bracket adapted to support said mechanism as a unit, and means for detachably connecting said bracket to said column, whereby said mechanism may be removed with said bracket from said column.

54. In a machine of the class described, a work support, an actuator adapted to intermittently depress said work support, means for adjusting said actuator automatically in accordance with the thickness of the work, and means for independently adjusting said actuator.

55. In a machine of the class described, a work support, an actuator adapted to intermittently depress said work support, means for adjusting said actuator constructed to cause it to depress said work support a predetermined distance irrespective of the thickness of the work, and means for adjusting said actuator to vary said predetermined distance.

56. In a machine of the class described, a work support, an actuator adapted to intermittently depress said work support a predetermined distance, means for adjusting said actuator, constructed to cause the uniform depression of said work support to be maintained irrespective of the thickness of the work, and means for adjusting said actuator to vary said predetermined distance.

57. In a machine of the class described, a work support, an actuator adapted to intermittently depress said work support, means for supporting said actuator for movement to different positions in accordance with the thickness of the work, means for locking said actuator while operating to depress said work support, and means for varying the position at which said actuator is locked.

58. In a machine of the class described, a work support, an actuator adapted to intermittently depress said work support, means for locking said actuator while operating to depress said work support, means for adjusting said actuator in accordance with the thickness of the work, and means for independently adjusting said actuator.

59. In a machine of the class described, a work support, an actuator adapted to intermittently depress said work support, means for supporting said actuator constructed to permit it to adjust itself to the thickness of the work, means for locking said actuator while operating to depress said work support, and means for varying the position at which said actuator is locked.

60. In a machine of the class described, a work support, an actuator adapted to intermittently depress said work support, means for supporting said actuator to move with said work support in accordance with the thickness of the work, means for locking said actuator while operating to depress said work support, and adjustable lost motion means between said actuator and said locking means.

61. In a machine of the class described, a work support, an actuator adapted to intermittently depress said work support, a member connected with said work support and actuated by said actuator, said actuator being adjustable with respect to said actuated member in accordance with the thickness of the work, means for locking said actuator while operating to depress said work support, and means for varying the position at which said actuator is locked.

62. In a machine of the class described, a work support, an actuator adapted to intermittently depress said work support, an abutment for said actuator, means for locking said abutment, and means for varying the position at which said abutment is locked.

63. In a machine of the class described, a work support, an actuator adapted to intermittently depress said work support, an abutment for said actuator movable to different positions in accordance with the thickness of the work, means for locking said abutment while said actuator depresses said work support and for releasing said abutment while said work support adjusts itself to the work, and means for varying the position at which said abutment is locked.

64. In a machine of the class described, a work support, means for causing said work support to normally clamp the work, an actuator adapted to intermittently depress said work support, means for movably supporting said actuator, means for locking said actuator while depressing said work support, and means for varying the position at which said actuator is locked.

65. In a machine of the class described, a work support, means for causing said work support to normally clamp the work, an actuator adapted to intermittently depress said work support, means for moving said actuator to maintain its engagement with said work support as the thickness of the work varies, means for locking said actuator while depressing said work support and for releasing said actuator while said work support clamps the work, and means for varying the position at which said actuator is locked.

66. In a machine of the class described, a work support, means for causing said work support to normally clamp the work, a cam for depressing said work support, means supporting said cam constructed to permit it to move in accordance with the thickness of the work, means for locking said cam while depressing said work support, and means for varying the position at which said cam is locked.

67. In a machine of the class described, a work support, a cam for moving said work support, means for movably supporting said cam, a ratchet adjustably connected to said cam, and a pawl for locking said ratchet.

68. In a machine of the class described, a work support, means for causing said work support to clamp the work, actuating means adapted to intermittently depress said work support, means for adjusting said actuating means to the thickness of the work after the work is clamped, and means for independently adjusting said actuating means.

69. In a machine of the class described, a work support, means for causing said work support to clamp the work, actuating means adapted to intermittently depress said work support, means for setting one of the elements of said actuating means in accordance with the thickness of the work after the work is clamped, and means for independently setting said element.

70. In a machine of the class described, a spindle, a depending arm on said spindle, a jack post pivoted on said arm, and adjusting means between said post and said arm comprising an adjusting element movable about a horizontal axis.

71. In a machine of the class described, a spindle, a depending arm on said spindle, a jack post pivoted on said arm, and adjusting means between said post and said arm comprising an adjusting element movable about a horizontal axis and adapted to sustain said jack post on said arm.

72. In a machine of the class described, a spindle, a depending arm on said spindle, an eccentric mounted for adjustment on said arm, and a jack post mounted on said eccentric.

73. In a machine of the class described, a spindle, a depending arm on said spindle, a jack post pivoted on said arm, and an eccentric mounted for adjustment on said arm and adapted to form a pivot for said jack post.

74. In a machine of the class described, a spindle, a depending arm on said spindle, an eccentric mounted for adjustment on said arm, and a jack post mounted for universal movement on said eccentric.

75. In a machine of the class described, a spindle, a depending arm on said spindle, an eccentric mounted for adjustment on said arm, a jack post mounted on said eccentric, and means for latching said eccentric in adjusted position.

76. In a machine of the class described, a spindle, a depending arm on said spindle, an eccentric mounted for adjustment on said arm, a jack post mounted for universal movement on said eccentric, and means for latching said eccentric in adjusted position.

77. In a machine of the class described, a spindle, a depending arm on said spindle, a jack post, and adjusting means between said arm and said jack post, adapted to pivotally sustain said post on said arm.

78. In a machine of the class described, a spindle, a depending arm on said spindle, a jack post, and adjusting means between said arm and said jack post, comprising an adjusting element adapted to pivotally sustain said post on said arm.

79. In a machine of the class described, a spindle, a depending arm on said spindle, a jack post, and adjusting means between said arm and said jack post, comprising an adjusting element, said post being mounted to swing about said element.

In testimony whereof I affix my signature in the presence of these two witnesses.

STEPHEN A. DOBYNE.

Witnesses:
B. F. WATKINS,
W. H. CHAMBERLIN.

Copies of this patent may be obtained for five cents each, by addressing the "Commissioner of Patents, Washington, D. C."